(12) United States Patent
Joy et al.

(10) Patent No.: US 10,336,862 B2
(45) Date of Patent: *Jul. 2, 2019

(54) BIODEGRADABLE POLYMERS WITH PENDANT FUNCTIONAL GROUPS ATTACHED THROUGH AMIDE BONDS

(71) Applicant: The University of Akron, Akron, OH (US)

(72) Inventors: Abraham Joy, Copley, OH (US); Sachin Gokhale, Pune (IN); Ying Xu, Nanjing (CN)

(73) Assignee: THE UNIVERSITY OF AKRON, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,160

(22) Filed: Feb. 14, 2017

(65) Prior Publication Data
US 2017/0247506 A1 Aug. 31, 2017

Related U.S. Application Data

(63) Continuation of application No. 14/381,295, filed as application No. PCT/US2013/028637 on Mar. 1, 2013, now Pat. No. 9,593,201.

(60) Provisional application No. 61/605,518, filed on Mar. 1, 2012.

(51) Int. Cl.
| | |
|---|---|
| *C08G 63/91* | (2006.01) |
| *C08G 63/685* | (2006.01) |
| *C08G 18/73* | (2006.01) |
| *C08G 18/32* | (2006.01) |
| *C08G 73/02* | (2006.01) |
| *C08G 18/38* | (2006.01) |
| *C09B 69/10* | (2006.01) |

(52) U.S. Cl.
CPC ......... *C08G 63/91* (2013.01); *C08G 18/3275* (2013.01); *C08G 18/3825* (2013.01); *C08G 18/73* (2013.01); *C08G 63/685* (2013.01); *C08G 63/6856* (2013.01); *C08G 63/916* (2013.01); *C08G 73/0233* (2013.01); *C09B 69/109* (2013.01)

(58) Field of Classification Search
CPC .............. C08G 63/6859; C08G 63/916; C08G 18/3275; C08G 18/73; C08G 18/3825
See application file for complete search history.

(56) References Cited

U.S. PATENT DOCUMENTS

| | | | |
|---|---|---|---|
| 3,507,830 | A | 4/1970 | Feinauer |
| 5,459,222 | A | 10/1995 | Rodgers et al. |
| 9,593,201 | B2 * | 3/2017 | Joy ............... C08G 63/6856 |
| 2008/0145338 | A1 | 6/2008 | Andersen et al. |
| 2010/0178267 | A1 * | 7/2010 | Puerta ............... A61K 8/85 424/70.17 |
| 2010/0233112 | A1 | 9/2010 | Hu et al. |
| 2016/0024251 | A1 * | 1/2016 | Joy ............... C07D 295/16 524/602 |

FOREIGN PATENT DOCUMENTS

| | | |
|---|---|---|
| EP | 1905789 | 4/2008 |
| WO | 2010040188 A1 | 4/2010 |
| WO | 2011045443 | 4/2011 |

OTHER PUBLICATIONS

Rulev, A.Y.; Russian Chemical Reviews, 2011, vol. 80, p. 197-218.*
Mohamed, M. M., et al.;Journal of Molecular Catalysis A: Chemical, vol. 211, 2004, p. 199-208.*
Katelyn M. Atkins, et al., A Versatile Approach for the Syntheses of Poly(ester amide)s with pendant functional groups, Journal of Polymer Science Part A: Polymer Chemistry, vol. 47, No. 15, 3757-3772 (Aug. 2009).
Mohamed, et al., Catalytic polymerization of N,N-diethanol acrylamide with phthalic anhydride in the presence of H-mordenite and Fe-mordenite zeolites; Journal of Molecular Catalysis A: Chemical 211 (2004) 199-208.
Jason Rochette, Photo-Responsive Polyesters for Shape Memory Biomaterials, Polymer Preprints, 2011, 52(1), 121, University of North Carolina—Chapel Hill, North Carolina.
Shukla Bhattacharya, Controlled-Release Polymeric Herbicide Formulations With Pendent 2,4-Dichlorophenoxyacetic Acid, American Chemical Society, 1986, 25, 585-589, Jadavpur University, Calcutta, India.
Lu Chengxun, Synthesis of Flexible Polyesters Containing Nucleic Acid Base Derivatives as Pending Side Chains, Chinese Science Bulletin, 1988, 33, 292, Peking University, Beijing.
C.X. Lu, Synthesis of Polyesters Containing Nucleic Acid Base Derivatives as Pending Side Chains, Journal of Polymer Science: Part A: Polymer Chemistry, 1986, 24, 525-536, Peking University, Beijing.

* cited by examiner

*Primary Examiner* — Robert S Jones
(74) *Attorney, Agent, or Firm* — Renner Kenner Greive Bobak Taylor & Weber

(57) ABSTRACT

Amide compounds are defined and are polymerized to create polyesters and polyurethanes having amide units bearing a pendant functional group, where the nitrogen atom of the amide group is part of the polymer backbone. The pendant functional group of the functionalized amide polymer may be modified or added by post polymerization functionalization of the functionalized amide polymer. The pendant functional group of the functionalized amide polymer may include a protecting group that may be removed after polymerization. The pendant functional groups of the functionalized amide polymers may be used to modulate the physical, chemical and biological properties of the polymers.

15 Claims, 2 Drawing Sheets

BIODEGRADABLE POLYMERS WITH PENDANT FUNCTIONAL GROUPS ATTACHED THROUGH AMIDE BONDS

CROSS-REFERENCE TO RELATED APPLICATION

This application claims priority from U.S. patent application Ser. No. 14/381,295 filed on Aug. 27, 2014, which claims priority from PCT application number PCT/US2013/28637 filed Mar. 1, 2013, which claims priority from U.S. provisional patent application Ser. No. 61/605,518 filed on Mar. 1, 2012, all of which are incorporated herein by reference in their entirety.

FIELD OF THE INVENTION

One or more embodiments, provides functionalized amide polymers, methods of using functionalized amide polymers, methods of preparing functionalized amide polymers, end functionalized amide compounds with a pendant functional group that may be used in one or more embodiments to produce functionalized amide polymers, and methods of preparing end functionalized amide compounds with a pendant functional group.

BACKGROUND OF THE INVENTION

Polymers made from step growth condensation are used in numerous applications. The properties of these polymers are dependent upon the type of monomer and the backbone structure. For example, polyethylene terephthalate is used for the manufacture of bottles with excellent barrier properties and nylon is useful for the manufacture of strong fibers. Usually, polymers made from step growth polymerization do not have any pendant functional group present along the backbone. However, in several applications, especially for biomedical applications, it would be very useful to have pendant functional groups along the backbone that modulate the physical and chemical properties of the polymers and can be used to provide optimum signaling cues in a biological environment. For example, poly(lactic acid) is commonly used for several biomedical applications since it is biodegradable and has good mechanical properties. However, it lacks any functional group along the backbone and cannot be used to provide any cues to interact with the biological environment. The current invention describes polymers made by step growth polymerization. These functional groups modulate the physical, chemical and biological properties of the polymers. They can also be used to conjugate appropriate groups to provide the desired functional outcome.

SUMMARY OF THE INVENTION

A functionalized amide polymer according to the following structure:

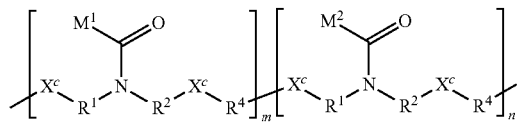

where every $X^C$ is a urethane group or every $X^C$ is an ester group; $R^1$ and $R^2$ may be the same or different and are each hydrocarbon groups; and where $R^1$ and $R^2$ may be selected to join to create a heterocyclic group that includes the nitrogen atom as a hetero atom within the heterocyclic group, m and n represent repeating units of the polymer in random or block configuration, $M^1$ and $M^2$ are pendant functional groupD The functionalize amide polymer of claim 1, $M^2$ is different from $M^1$.

A functionalized amide polymer comprising: a polymer backbone selected from polyesters and polyurethanes; and an amide group with a pendant functional group, where the nitrogen atom of the amide group is part of the polymer backbone, with the proviso that the pendant functional group is not a fatty oil.

The functionalize amide polymer of claim 3, wherein the polymer has a number molecular weight of at least 10,000.

The functionalized amide polymer of claim 3, where the polymer includes a unit defined by:

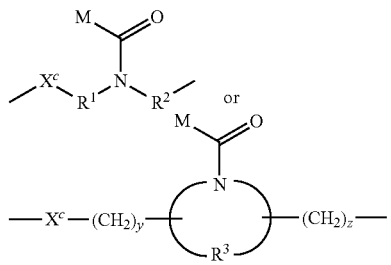

where each $X^C$ is a urethane group or an ester group; $R^1$ and $R^2$ may be the same or different and are each hydrocarbon groups; $R^3$ is a heterocyclic group that includes the nitrogen atom as a hetero atom within the heterocyclic group; y and z may be the same or different and are from 0 to 4, and M is a pendant functional group.

The functionalized amide polymer of claim 3, where the polymer includes a unit defined by:

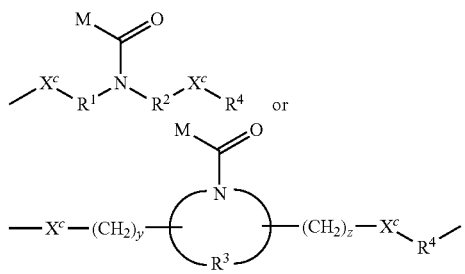

where each $X^C$ is a urethane group or an ester group; $R^1$ and $R^2$ may be the same or different and are each hydrocarbon groups; $R^3$ is a heterocyclic group that includes the nitrogen atom as a hetero atom within the heterocyclic group; y and z may be the same or different and are from 0 to 4, and $R^4$ is a hydrocarbon group.

DETAILED DESCRIPTION OF ILLUSTRATIVE EMBODIMENTS

Figure 1:
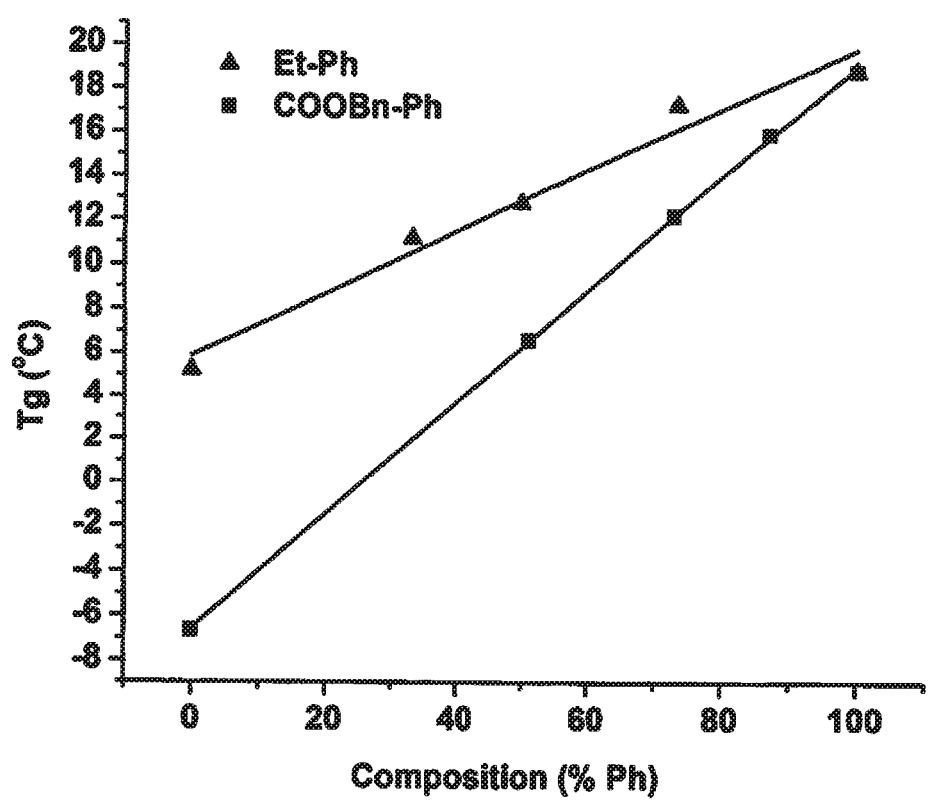
FIG. 1 provides a graphical plot of Tg (° C.) versus percent composition of a pendant functional group for one or more embodiments where two different pendent functional groups are present.

In the present invention, an end functionalized amide compound having a pendant functional group is polymerized to create polyesters and polyurethanes having amide units bearing the pendant functional group. The different end functionalization lends itself to the creation of the different polymers as will be described herein. In some embodiments, copolymers are created, with amide units thereof providing different pendant functional groups, the amide units being in random or block configurations. Herein, the end functionalized amide compound having a pendant functional group may be referred to as the "amide compound" for brevity.

In one embodiment, the amide compound is defined by formulas (I) and (II):

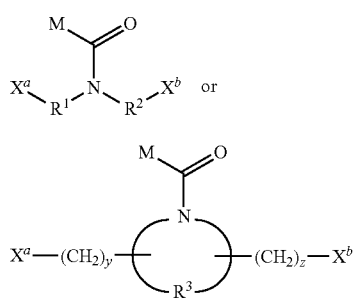

where $X^a$ and $X^b$ may be the same or different and are each selected from a hydroxyl group and a carboxylic acid group; $R^1$ and $R^2$ may be the same or different and are each hydrocarbon groups; $R^3$ is a heterocyclic group that includes the nitrogen atom as a hetero atom within the heterocyclic group, and y and z may be the same or different and are from 0 to 4, and M is a pendant functional group. In some embodiments, one of $X^a$ and $X^b$ is a hydroxyl group while the other of $X^a$ and $X^b$ is a carboxylic acid group. It will be appreciated that the formulas (I) and (II) can be conceptualized as being related, in that the $R^1$ and $R^2$ of formula (I) join to create a heterocyclic group represented by $R^3$, the heterocyclic group including the nitrogen atom as a hetero atom within the heterocyclic group.

In one or more embodiments, M may be virtually any organic group. In one or more embodiments, M may be an organic pendant functional group. In one or more embodiments, M may be an organic pendant functional group, but excluding fatty oils In some embodiments, M is a group capable of reacting with other reagents to provide a desired functionality in a post-polymerization functionalization step that will be described herein. In other embodiments, M includes a protecting group that protects the M group from reacting with other reagents during monomer creation or polymer creation or both or during post functionalization steps, particularly with multifunctional polymers as described herein.

Representative examples of organic pendant functional groups include but are not limited to:

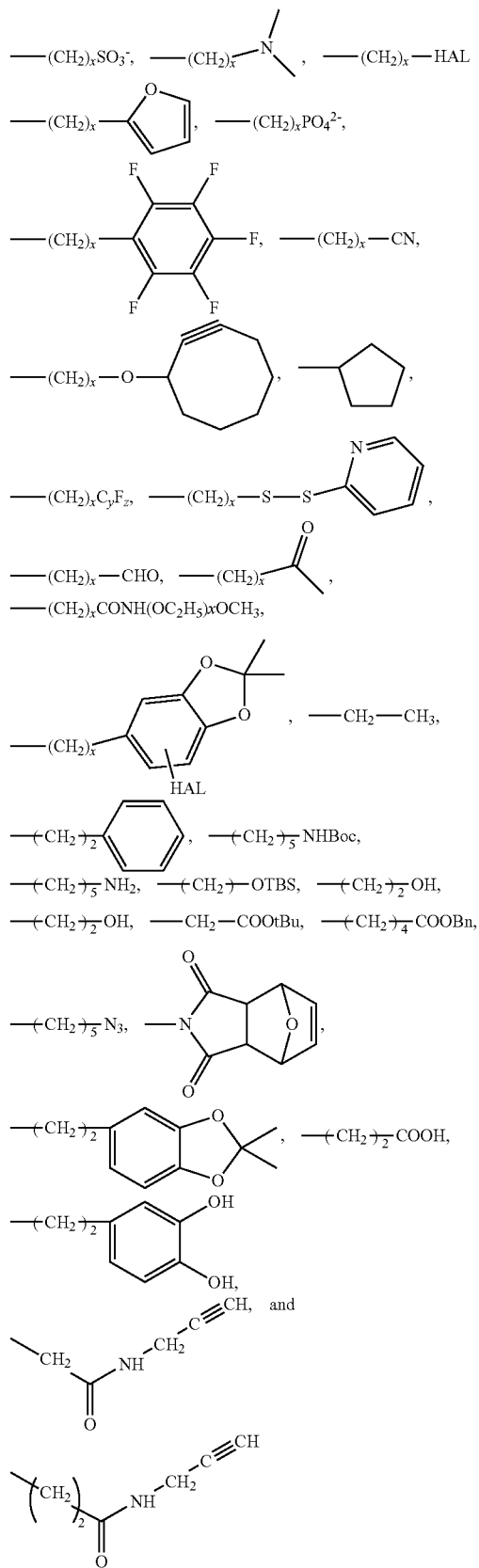

wherein x is from 0 to 6, and HAL denotes a halogen. It is specifically noted that, thought specific number are provided for repeating unit of —CH2— in some of the above structures, the present invention can be practice with x repeating units of those structures. Herein, it will be understood that Boc stands for tert-butyloxycarbonyl, TBS stands for ditert-butyl dimethylsilyl, tBu stands for t-Butyl, Bn stands for benzyl.

Representative examples of groups suitable for post polymerization functionalization include groups with azide, carboxylic acid, hydroxyl, amine, nitrile, furan, aldehyde/ketone, maleimide, propargyl, or halogen functionality.

Particular non-limiting examples include:

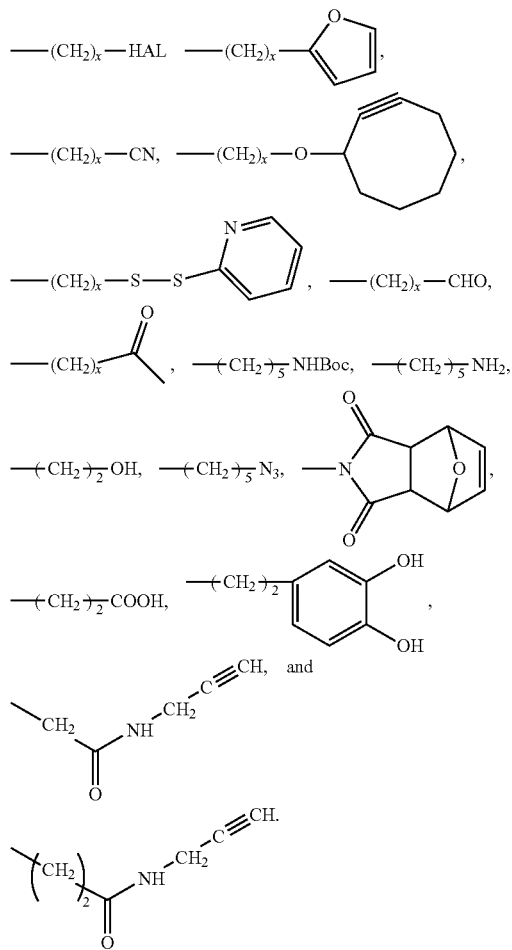

Representative examples of protected groups include M groups protected with tert-butyloxycarbonyl, pyridyl disulfide, t-Butyl, benzyl, ketal, and ditertbutyl dimethylsilyl. Non-limiting examples include:

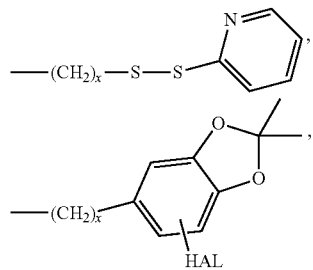

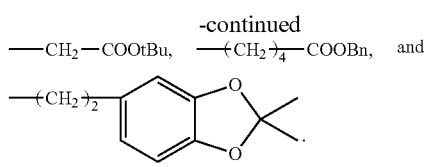

In one or more embodiments, M may be an amino acid side chain. An amino acid side chain is a group that includes a terminal functional group of an amino acid. In one or more embodiments, the terminal functional group of the amino acid is attached to a carbon chain or connecting group. In some embodiments, the carbon chain is a different length than the chain of the corresponding amino acid. Representative examples of residues of an amino acid side chain include, but are not limited to:

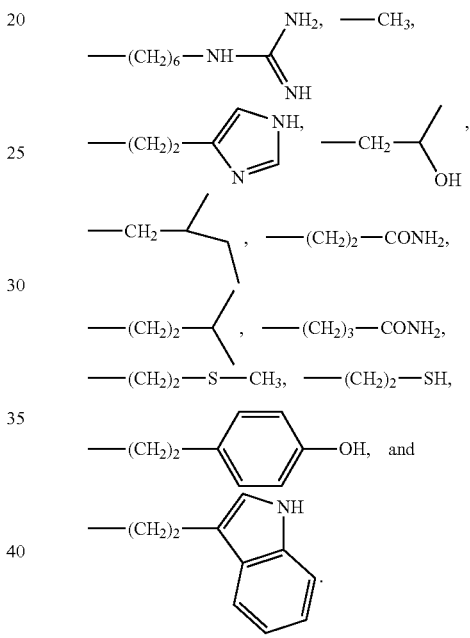

In one or more embodiments, $R^1$ and $R^2$ are hydrocarbon chains of a length of from 1 to 10 carbon atoms (C1 to C10). In one or more embodiments, $R^1$ and $R^2$ are hydrocarbon chains of from 1 to 6 carbon atoms (C1 to C6). In one or more embodiments, $R^1$ and $R^2$ are hydrocarbon chains of from 1 to 3 carbons atoms (C1 to C3).

Specific examples of hydrocarbon groups suitable for use as $R^1$ and $R^2$ include, but are not limited to, an ethylene group.

In one or more embodiments, $R^3$ is an organic group that forms a heterocycle with the nitrogen atom. In one or more embodiments, the organic group of R3 may include oxygen as a heteroatom. In one or more embodiments, the organic group of R3 is a hydrocarbon group. In one or more embodiments, $R^3$ is a hydrocarbon chain from 2 to 5 carbon atoms. In one or more embodiments, $R^3$ is a hydrocarbon chain from 4 to 5 carbon atoms. In one or more embodiments, $R^3$ is a hydrocarbon chain of about 4 carbon atoms.

In one or more embodiments, where $X^a$ and $X^b$ of formula (I) are hydroxyl groups, the amide compound is a diol defined by formulas (III) or (IV):

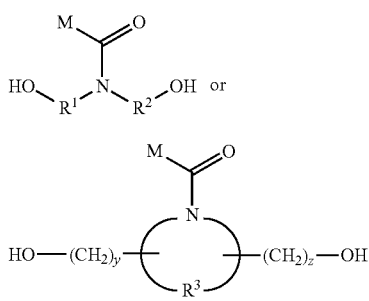

(III)

(IV)

where $R^1$, $R^2$, $R^3$, y, z and M are selected as defined above.

In other embodiments of formula (III), $R^1$ and $R^2$ are ethylene (—$CH_2CH_2$—).

In other embodiments of formula (IV), $R^3$ forms a pyrrolidine group with the nitrogen atom. In other embodiments, $R^3$ forms a pyrrolidine group with the nitrogen atom, and y is 0. In other embodiments, $R^3$ forms a pyrrolidine group with the nitrogen atom, and y is 1.

In one or more embodiments, where $X^a$ and $X^b$ of formula (I) are carboxylic acid groups, the amide compound is a dicarboxylic acid defined by formulas (V) or (VI):

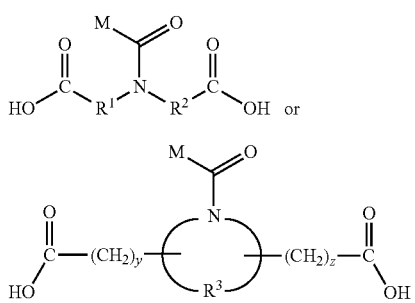

(V)

(VI)

where $R^1$, $R^2$, $R^3$, y, z are and M are selected as defined above.

In other embodiments of formula (V), $R^1$ and $R^2$ hydrocarbons having from 1 to 6 carbons (i.e., C1 to C6).

In other embodiments of formula (VI), $R^3$ forms a pyrolidine group with the nitrogen atom. In other embodiments, $R^3$ forms a pyrolidine group with the nitrogen atom, and y is 3. In other embodiments, $R^3$ forms a pyrrolidine group with the nitrogen atom, and y is 4.

In one or more embodiments, where $X^a$ of formula (I) is a hydroxyl group and $X^b$ is a carboxylic acid group, the amide compound is a hydroxyacid defined by formula (VII):

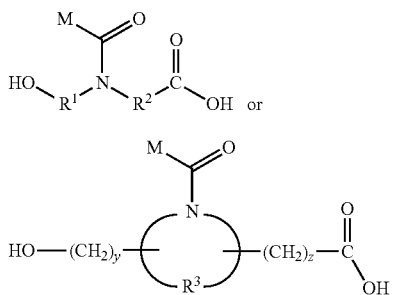

(VII)

(VIII)

where $R^1$, $R^2$, $R^3$, y, z and M are selected as defined above.

To avoid instances where the carboxylic acid end group and hydroxyl might react through and intra-molecular reaction, $R^1$ and $R^2$ are kept relatively large. Thus, in other embodiments of formula (VII), $R^1$ is a hydrocarbon group of greater than C2 and $R^2$ is a hydrocarbon group of C2 or greater.

In other embodiments of formula (VIII), $R^3$ forms a pyrrolidine group with the nitrogen atom. In other embodiments, $R^3$ forms a pyrrolidine group with the nitrogen atom, and y and z are 0 to 2. In other embodiments, $R^3$ forms a pyrrolidine group with the nitrogen atom, and y is 2, and z is 1.

In one or more embodiments, the end functionalized amide compound with a pendant functional group may be prepared by reacting bis(hydroxyhydrocarbyl)amine with a functionalized ester.

In one or more embodiments, the bis(hydroxyhydrocarbyl)amine may be defined by the formula (IX) and formula (X):

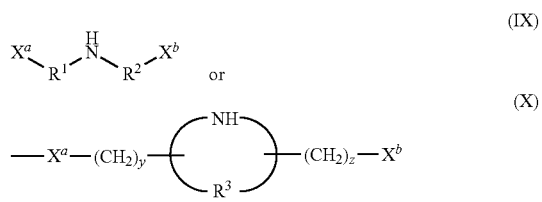

(IX)

(X)

where $X^a$, $X^b$, $R^1$, $R^2$, $R^3$ y and z are selected as described above.

In one or more embodiments, the functionalized ester may be defined by the formula (XI):

(XI)

where $R^5$ is a hydrocarbon group, and M is selected as defined above.

Methods of reacting the bis(hydroxyhydrocarbyl)amine or hydroxyhydrocarbyl carboxylic acid amine with funtionalized ester as above are known in the art as for example in Gaozza, C. H., J. Med. Chem., Vol. 8, pg. 400-01, (1965).

In other embodiments, the amide compounds may be prepared by reacting a protected bis(hydrocarbyloxy)amine or protected hydroxyhydrocarbyl carboxylic acid amine with a functionalized carboxylic acid.

In one or more embodiments, the protected bis(hydrocarbyloxy)amine or protected hydroxyhydrocarbyl carboxylic acid amine may be defined by formula (XII) and formula (XIII):

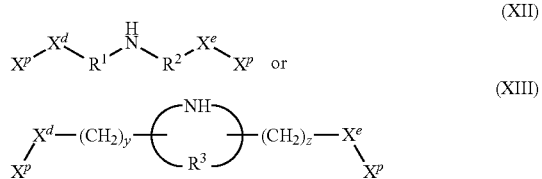

(XII)

(XIII)

where $X^d$ and $X^e$ may be the same or different and are each selected from an oxygen atom and an ester group, with the proviso that when one of $X^d$ or $X^e$ is an ester group the other is an oxygen atom; $R^1$, $R^2$ and R3 may be selected as described above; and each XP may be the same or different and are each protecting groups.

Examples of suitable protecting groups include, but are not limited to, a benzyl group or a t-butyl dimethyl silyl group.

In one or more embodiments, the functionalized carboxylic acid may be defined by the formula (XIV):

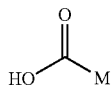
(XIV)

where M is selected as defined above.

The protected bis(hydrocarbyloxy)amine and functionalized carboxylic acid are reacted by carbodiimide-mediated (EDC, i.e., ethyl(dimethylaminopropyl) carbodiimide) coupling reaction to form a protected version of the amide compound. Suitably solvents for the coupling reaction include dimethylformamide (DMF).

In one or more embodiments, the protecting group may be removed with $I_2$ in an alcohol. In these or other embodiments, a t-butyl dimethyl silyl protecting group may be removed with $I_2$ in methanol. In one or more embodiments, the protecting group may be removed with $H_2$ in an alcohol with the presence of a palladium catalyst. In these or other embodiments, a benzyl protecting group may be removed with $H_2$ in methanol with the presence of a palladium catalyst. Removal yields the amide compound.

In the present invention, the amide compounds as disclosed above are polymerized to create polyesters and polyurethanes having amide units bearing the pendant functional group (i.e., M), where the nitrogen atom of the amide group is part of the polymer backbone. In one or more embodiments, the pendant functional group of the functionalized amide polymer may be modified or added by post polymerization functionalization of the functionalized amide polymer. In one or more embodiments, the pendant functional group of the functionalized amide polymer may include a protecting group that may be removed after polymerization.

As previously mentioned, the nitrogen atom of the amide group is part of the polymer backbone, such that polymers herein can be generally conceptualized by the structure below:

where ∿∿∿ generally represents a polymer backbone selected from polyesters and polyurethanes; and M are as described herein.

In one or more embodiments, the functionalized amide polymer may include a unit defined by formula (XV) and formula (XVI):

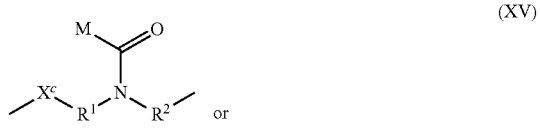
(XV)

or

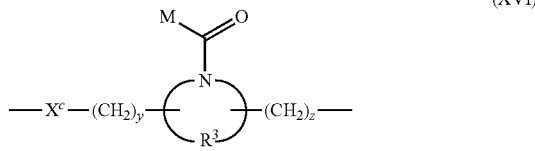
(XVI)

where $X^C$ is an ester or urethane group; $R^1$, $R^2$, $R^3$, y and z are selected as described above. In one or more embodiments, these units are repeating units in a polymer.

In one or more embodiments, the functionalized amide polymer may be defined by formula (XVII) and formula (XVIII):

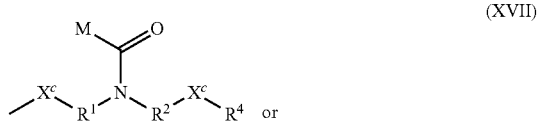
(XVII)

or

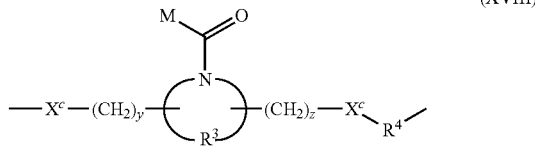
(XVIII)

where each $X^C$ is a urethane group or an ester group; $R^1$, $R^2$, $R^3$, y, z and M are selected as described above, and $R^4$ is a hydrocarbon group. In one or more embodiments, these units are repeating units in a polymer.

The functionalized amide polymer may include multiple functionalized amide units. In one or more embodiments, the functionalized amide polymer may include two or more different amide units. In these or other embodiments, the two or more different amide units may be in random or block configurations.

In one or more embodiments, the functionalized amide polymer may be defined by formula (XIX):

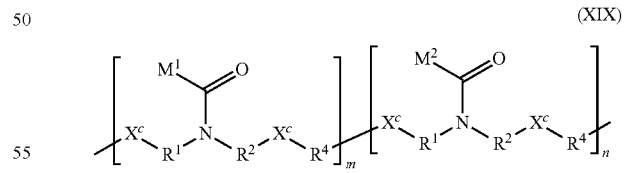
(XIX)

where every $X^C$ is a urethane group or every all $X^C$ is an ester group; $R^1$, $R^2$, $R^4$, are selected as described above, and where $R^1$ and $R^2$ may be selected to join to create a heterocyclic group that includes the nitrogen atom as a hetero atom within the heterocyclic group; $M^1$ is selected as described above for M; $M^2$ is selected from any functional group, and m and n represent repeating units of the polymer in random or block configuration. In some embodiments, $M^2$ is selected as described above for M, with the proviso that it is different from $M^1$.

In particular embodiments, the functional amide polymer may be a multifunctional polyester defined as below:

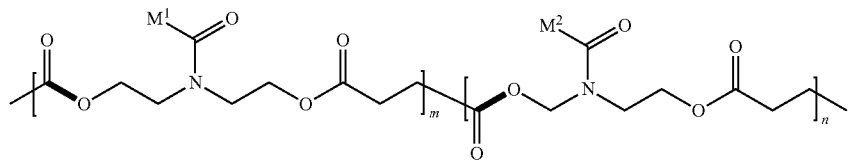

wherein $M^1$ and $M^2$ are different and are chosen as above.

In other embodiments, the functional amide polymer may be a multifunctional polyurethane defined as below:

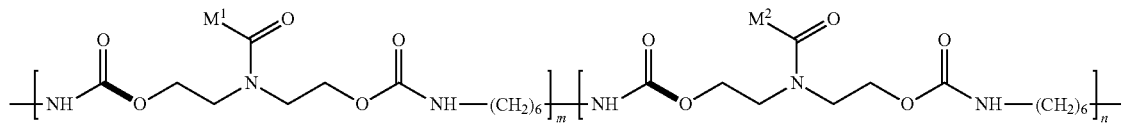

wherein $M^1$ and $M^2$ are different and are chosen as above.

In one or more embodiments, the functionalized amide polymer may be defined by formula (XX):

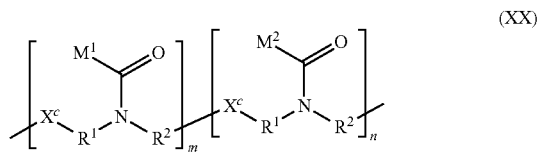

where $X^C$ is an ester group; $R^1$ and $R^2$ are selected as described above, and where $R^1$ and $R^2$ may be selected to join to create a heterocyclic group that includes the nitrogen atom as a hetero atom within the heterocyclic group as described above; $M^1$ is selected as described above for M; $M^2$ is selected from any functional group, and m and n represent random or alternating repeating units of the polymer. In some embodiments, $M^2$ is selected as described above for M, with the proviso that it is different from $M^1$.

In other embodiments, the functional amide polymer may be a multifunctional polyurethane defined as below:

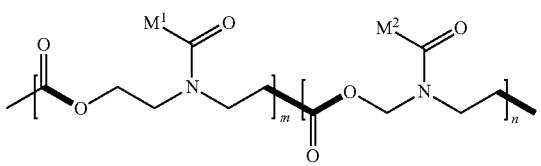

wherein $M^1$ and $M^2$ are different and are chosen as above.

While depicted above as a polymer with two different amide units, the functionalized amide polymer may in other embodiments have more than two amide units. In one or more embodiments, the functionalized amide polymer may have 3, 4, 5, 6, 7, 8, 9, 10, or more different amide units.

Polymer with adhesion properties may include a polymer with alternating organic pendant group and catechol pendant group in a polyester or polyurethane. Representative examples of organic pendant groups for use in adhesives include, but are not limited to, ethyl, propyl phenyl, hydroxy and amine groups.

The amide compounds of this invention may be diols, dicarboxylic acids or hydroxyacids as already described above. When they are hydroxyacids, polyester polymers can be prepared by stepwise self polymerization of the hydroxyacid compounds. When the amide compounds are diols, polymers may be prepared by stepwise polymerization of the amide compounds with a comonomer, and, when the comonomer is a diacid, a polyester results, and, when the comonomer is a diisocyanate, a polyurethane results. When the amide compounds are dicarboxylic acids, polymers may be prepared by stepwise polymerization of the amide compounds with a diol comonomer, and a polyester results.

In one or more embodiments, a functionalized amide polyester is prepared by self polymerizing a hydroxyacid amide compound of this invention, as defined by formulas (VII) and (VIII). The hydroxyacids are polymerized by carbodiimide-mediated (DIC, diisoproplycarbodiimide) coupling reaction in dichloromethane (or other suitable solvent).

In one or more embodiments, a random polymer configuration may be prepared by polymerizing a mixture of two or more hydroxyacid amide compounds with different M groups.

In one or more embodiments, a block polymer configuration may be prepared by first polymerizing an amide compound having a first pendant M group. Following polymerization, the compound is endcapped with a reactive end group. A second amide compound is polymerized with a different M group. Then end capping this second amide compound with a complimentary end group suitable for reacting with the first end group of the first polymer thereby joining them in a block configuration. Examples of complementary pairs of end groups include propargyl and azide (first exemplary pair) and thiol and ene (second exemplary pair).

In one or more embodiments, a functionalized polymers are prepared from the reaction product of a diol amide compound of this invention with a comonomer selected from diacids and diisocyanates. The diol amide compound is defined above in formulas (III) and (IV).

In one or more embodiments, the comonomer is a diacid or diisocyanate defined by:

$$X^f-R^5-X^f$$

where $X^f$ is selected from carboxylic acid groups and isocyanate groups, and $R^5$ is a hydrocarbon group.

The hydrocarbon group $R^5$ may be a linear, cyclic, or branched hydrocarbon group. In the case of dicarboxylic acid, the $R^5$ is a hydrocarbon group of from C2 to C8, in other embodiments, from C2 to C6, and in yet other embodiments C2 to C4. In the case of diisocyanates, the $R^5$ is a hydrocarbon group of from C6 to C10, in other embodiments, from C6 to C8, and in yet other embodiments C6.

In one or more embodiments, where each $X^f$ is a carboxylic acid group, the comonomer is a dicarboxylic compound. Representative examples of dicarboxylic compounds suitable for use as a comonomer include, but are not limited to, succinic acid, glutaric acid, adipic acid, pimelic acid, and suberic acid.

In one or more embodiments, where each $X^f$ is an isocyanate group, the comonomer is a diisocyanate compound. Representative examples of diisocyanate compounds suitable for use as a comonomer include, but are not limited to, hexamehylene diisocyanate and 1,3-phenylene diisocyanate.

In one or more embodiments, a functionalized amide polyester may be prepared by reacting a dicarboxylic comonomer with a diol amide compound as defined by Formula (III). The diol amide compound and the dicarboxylic comonomer are polymerized by carbodiimide-mediated (DIC, diisoproplycarbodiimide) coupling reaction in dichloromethane (or other suitable solvent). In one or more embodiments, a random polymer configuration may be prepared by polymerizing a mixture of two or more diol amide compounds with different M groups.

In one or more embodiments, a functionalized amide polyurethane may be prepared by reacting a diisocyanate comonomer with an end functionalized amide compound with a diol amide compound as defined by Formula (III). The diol amide compound is reacted with the diisocyanate in the present of tin(II)octoate in dichloromethane or DMF. In one or more embodiments, a random polymer configuration may be prepared by polymerizing a mixture of two or more diol amide compounds with different M groups.

In one or more embodiments, functionalized polymers are prepared from the reaction product of a dicarboxylic acid amide compound of this invention with a diol comonomer. The dicarboxylic acid amide compound is defined above in formulas (V) and (VI). The diol comonomer is defined by the formula:

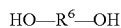

The hydrocarbon group $R^6$ may be a linear, cyclic, or branched hydrocarbon group. In some embodiments, the $R^6$ is a hydrocarbon group of from C1 to C10, in other embodiment from C1 to C6. In one or more embodiments, a random polymer configuration may be prepared by polymerizing a mixture of two or more dicarboxylic acid amide compounds with different M groups.

The molecular weight of the functionalized amide polymers of this invention may be determined through size exclusion chromatography. In one or more embodiments, the functionalized amide polymers are made to have a number average molecular weight from 10,000 to 200,000 g/mol. In one or more embodiments, the functionalized amide polymers are made to have a number average molecular weight from 20,000 to 160,000 g/mol. The polydispersity ranges from 1.1 to 2.0.

As mentioned herein, M can be chosen as a group capable of reacting with other reagents to provide a desired functionality in a post-polymerization functionalization step. In such instances, polymers are created, as above, and the M group is thereafter reacted with a functionalizing group P to provide a desired pendant functionality.

P may be chosen to be a suitably protected amino acid and can be bound to a suitably chosen M group. Representative examples of amino acids include, but are not limited to histidine, alanine, isoleucine, arginine, leucine, asparagine, lysine, aspartic acid, methionine, cysteine, phenylalanine, glutamic acid, threonine, glutamine, tryptophan, glycine, valine, proline, serine, and tyrosine.

P may be chosen to be suitably protected peptide and can be bound to a suitably chosen M group. Representative examples of peptides include but are not limited to GRGDS, RGD, and YIGSR.

In one or more embodiments, P is an imaging label. In one or more embodiments, the imaging label is a fluorescence imaging label. Fluorescence imaging labels may be a group that emits light upon excitation. Excitation energies may be ultraviolet light, visible light, or a combination thereof. Emission energies may be visible light, infrared light, near infrared or a combination thereof. Representative examples of fluorescence imaging labels include, but are not limited to

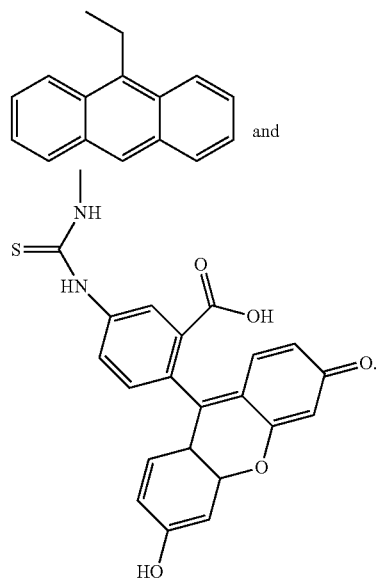

In one or more embodiments, the imaging label may be a radiographic imaging label. Radiographic imaging labels may be a group that provides an electron density suitable to provide contrast on a radiogram. Representative examples of radiographic imaging labels include, but are not limited to fluorine-19. In one or more embodiments, the radiographic imaging label may be an organic group where one or more hydrogen atoms is substituted with fluorine-19.

In one or more embodiments, P may be a polyethylene glycol chain.

The pendant functional groups of the functionalized amide polymers may be used to modulate the physical, chemical and biological properties of the polymers.

In one or more embodiments, the pendant functional groups may be used to alter the solubility of polymer. For example, when M is hydroxyl a homopolymer according to this invention will be water soluble. In one or more embodiments, when a hydrophilic polymer is desired, the polymer may include hydrophilic M groups. The hydrophilic M groups may be used in combination with another M group that may be used to provide a different function. In other embodiments, when a hydrophobic polymer is desired, the polymer may include hydrophobic M groups. The hydrophobic M groups may be used in combination with another M group that may be used to provide a different function.

For example, an amphiphilic polymer can be created by having repeating units of a hydrophobic M group and a repeating unit of a hydrophilic M group.

In the example section herein specific data is given regarding the effect of pendant groups on water contact angles and Tg.

In one or more embodiments, the polymer will be biodegradable. In particular embodiments, the biodegradable polymer is a polyester.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Experimental Procedures for Synthesis of Functionalized Diols

General procedure for the synthesis of diols from functionalized carboxylic acids.

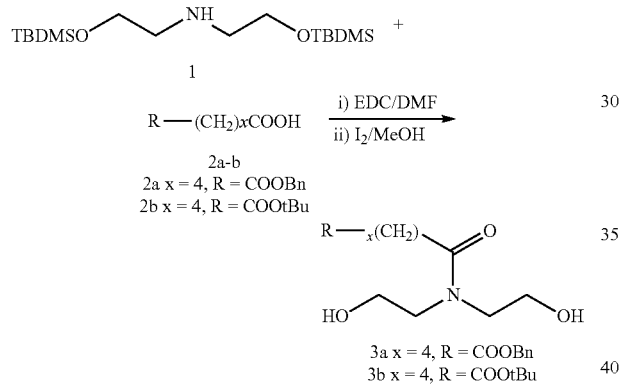

Diol 3a: Mono benzyl adipate (3.07 g, 13 mmol) and EDC (2.68 g, 13 mmol) were taken in the RB flask. In this 15 mL dry DMF was added and stirred for 10 mins. To this activated carboxylic acid, compound 2a (3.33 g, 10 mmol) dissolved in 5 mL in DMF was added and reaction was stirred overnight. After completion of reaction, DMF was removed under reduced pressure and compound was extracted with 100 mL ethyl acetate (EtOAc). The organic layer was washed with 10% $NaHCO_3$ solution and brine and dried over anhy. $Na_2SO_4$. The crude product was purified column chromatography with Hexane-EtOAc. Yield=3.4 g (61%)

$^1$H NMR (300 MHz, $CDCl_3$): δ 1.66-1.71 (m, 4H), 2.37-2.44 (m, 4H), 3.47 (dd, $J_1$=4.98 Hz, $J_2$=5.27 Hz, 2H), 3.54 (dd $J_1$=4.68, $J_2$=4.98 Hz, 2H), 3.76 (t, $J_1$=4.98, $J_2$=5.27 Hz, 2H), 3.84 (t, J=4.68 Hz, 4.98 Hz, 2H), 5.11 (s, 2H), 7.31-7.36 (m, 5H). $^{13}$C NMR (75 MHz, $CDCl_3$): δ 24.5, 33.1, 50.4, 52.1, 60.7, 61.5, 66.2, 128.2, 128.5, 135.9, 173.4, 174.9. (ESI-MS) Cal: 309.36, Obs.=311.2+$Na^+$

Diol 3b: Similar procedure was followed as per synthesis of 3a. Yield=75%.

$^1$H NMR (300 MHz, $CDCl_3$): δ 1.44 (s, 9H), 2.65 (m, 4H), 3.57 (m, 4H), 3.85 (m, 4H). $^{13}$C NMR: (75 MHz, $CDCl_3$) δ 28.0, 28.1, 30.6, 50.6, 52.1, 60.7, 61.1, 80.8, 172.8, 173.6. (ESI-MS) Cal: 261.31, Obs.=261.9, 261.31+$Na^+$

General procedure for the synthesis of diols from ester derivatives of functionalized carboxylic acids.

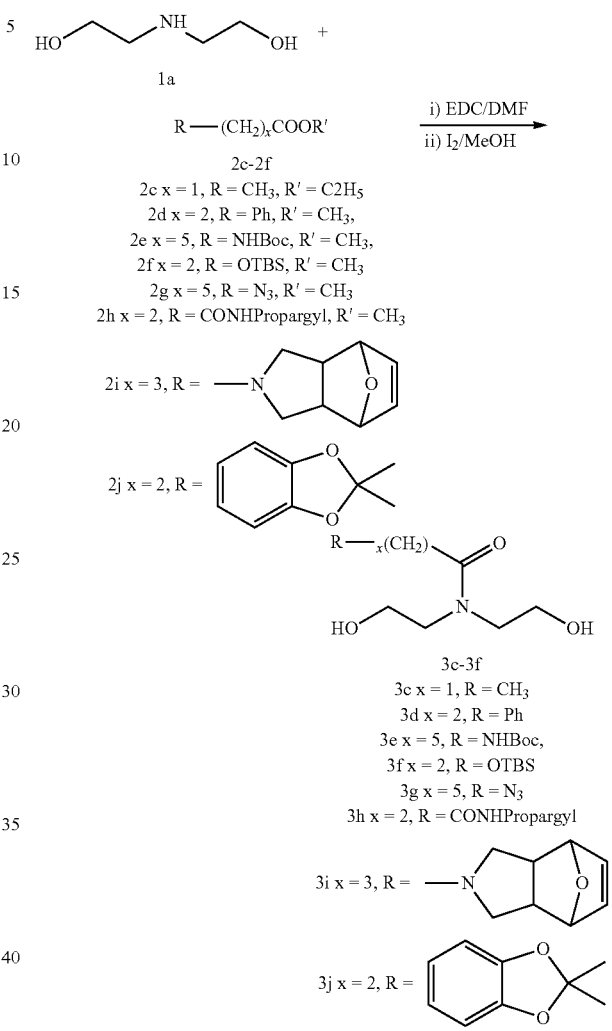

Diethanol amine 1a (1 equivalent) and ester derivative of functionalized carboxylic acid (1 equivalent) was taken in the RB flask and heated at 70° C. for 8 hrs. Then this reaction mixture was purified by column chromatography with DCM-MeOH as gradient solvent system. The pure diol was dried and used for polymerization reaction.

Diol 3c: Yield=76% (12.0 g), $^1$H NMR: (300 MHz, $CDCl_3$) δ1.16 (dd, 3H, $J_1$=7.61 Hz, $J_2$=7.32 Hz), 2.39-2.50 (m, 2H), 3.50-3.59 (m, 4H), 3.78-3.90 (m, 4H). $^{13}$C NMR: (75 MHz, $CDCl_3$) δ 9.3, 26.7, 52.1, 60.6, 176.2. (ESI-MS) Cal.=161.20, Obs.=162.3

Diol 3d: Yield=63%, $^1$H NMR: (300 MHz, $CDCl_3$) δ 2.65-2.74 (dd, $J_1$=7.61 Hz, $J_2$=8.20 Hz, 2H), 2.95-3.00 (dd, $J_1$=7.99 Hz, $J_2$=8.20 Hz, 2H), 3.42 (t, J=4.98 Hz, 2H), 3.54-3.57 (dd, $J_1$=4.39 Hz, $J_2$=4.98 Hz, 2H), 3.70 (t, J=4.98 Hz, 2H), 3.85 (t, J=4.68 Hz, 2H), 7.21-7.32 (m, 5H). $^{13}$C NMR: (75 MHz, $CDCl_3$) δ 31.4, 35.3, 50.6, 52.1, 126.2, 128.4, 141.0, 174.5. (ESI-MS) Cal.=237.29, Obs.=238.2, 237.2+$Na^+$ Diol 3e: Yield: $^1$H NMR: (300 MHz, $CDCl_3$) δ1.34-1.55 (m, 13H), 1.63-1.73 (m, 2H), 2.41 (t, =7.32 Hz, 2H), 3.10 (t, J=6.73 Hz, 2H), 3.49-3.57 (m, 4H), 3.77-3.86 (m, 4H). $^{13}$C NMR: (75 MHz, CDCl$_3$) δ 24.6, 26.2, 28.4, 29.6, 33.2, 40.2, 50.4, 52.1, 60.6, 61.3, 79.1, 156.2, 175.2 (ESI-MS) Cal.=318.41, Obs.=319.3.

Diol 3f: Yield=50% $^1$H NMR: (300 MHz, CDCl$_3$) δ 0.08 (s, 6H), 0.9 (s, 9H), 2.68 (t, 2H, J=6.15 Hz), 3.28 (bs, 2H), 3.57-3.6 (m, 4H), 3.78-3.87 (m, 4H), 3.99 (dd, 2H, J=615 Hz, 6.44 Hz) 13C NMR: (75 MHz, CDCl$_3$) δ-5.5, 18.2, 25.8, 36.2, 50.8, 60.5, 61.5, 173.87. (ESI-MS) Cal.=291.46, Obs.=292.1, 291.46+Na$^+$ Diol 3 g: Yield=50% $^1$H NMR: (300 MHz, CDCl$_3$) δ 1.42-1.49 (m, 2H), 1.60-1.72 (m, 4H), 2.41-2.46 (m, 2H), 3.27-3.31 (m, 4H), 3.50-3.59 (m, 4H), 3.78-3.89 (m, 4H), 13C NMR: (75 MHz, CDCl$_3$) δ 24.6, 26.3, 28.6, 33.2, 50.4, 51.2, 61.2, 175.0. (ESI-MS) Cal.=244.29, Obs.=244.29+Na$^+$ Diol 3h: Yield=78% $^1$H NMR: (300 MHz, CDCl$_3$+DMSO) δ 2.61-2.21 (m, 1H), 2.56-2.60 (m, 2H), 2.72-2.89 (m, 2H), 3.53 (m, 2H), 3.72-3.81 (m, 4H), 3.99-4.10 (m, 2H), 6.51 (bs, 1H). $^{13}$C NMR: (125 MHz, CDCl$_3$) δ 27.7, 30.3, 48.4, 50.4, 58.8, 72.8, 81.2, 171.3, 171.5. (ESI-MS) Cal.=242.27, Obs.=241.1+Na$^+$ Experimental Procedures for Synthesis of Polyesters Functional diol (1 equivalaent) and succinic acid (1 equivalaent) were weighted accurately in the Rb flask. DPTS (0.2 equivalent) was added to this and it was diluted with 10 mL dry DCM. Then this mixture was warmed up to 40° C. for 1-2 mins. and mixture was cooled back to 0° C. To this cooled mixture DIC (3 equivalents) was added dropwise and reaction mixture was warmed to RT and stirred for 24 hrs. Then polymer was precipitated from cold isopropanol/methanol and dried.

For the synthesis of copolymers with 2 or more functionalized diols and succinic acid, the total equivalents of diols were equivalent to succinic acid.

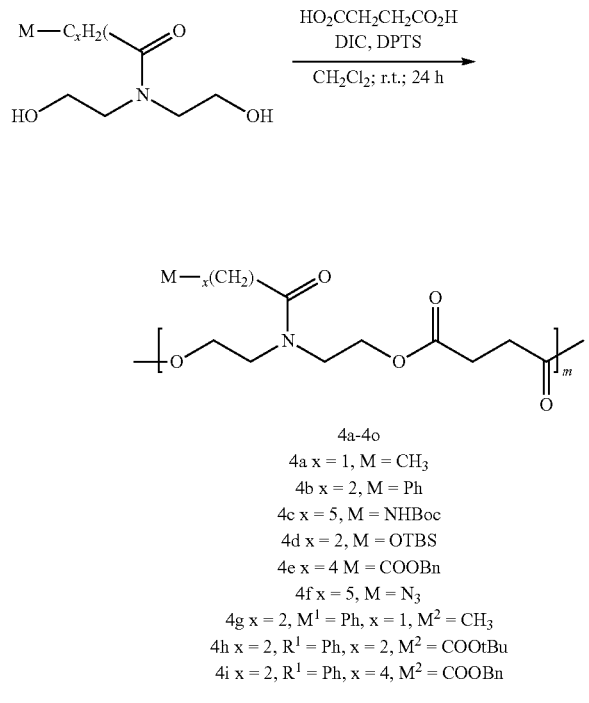

4a x = 1, M = CH$_3$
4b x = 2, M = Ph
4c x = 5, M = NHBoc
4d x = 2, M = OTBS
4e x = 4 M = COOBn
4f x = 5, M = N$_3$
4g x = 2, M$^1$ = Ph, x = 1, M$^2$ = CH$_3$
4h x = 2, R$^1$ = Ph, x = 2, M$^2$ = COOtBu
4i x = 2, R$^1$ = Ph, x = 4, M$^2$ = COOBn
4j x = 5, M$^1$ = NHBoc, x = 2, M$^2$ =CONHCH$_2$O≡CH
4k x = 5, M$^1$ = NHBoc, x = 4, M$^2$ = COOBn
4l x = 2, M$^1$ = OTBS, x = 2, M$^2$ = Ph

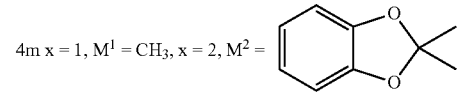

4m x = 1, M$^1$ = CH$_3$, x = 2, M$^2$ =

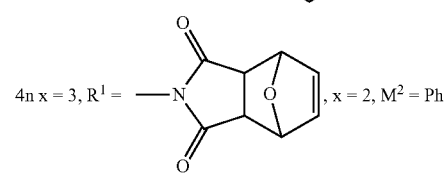

4n x = 3, R$^1$ = ——, x = 2, M$^2$ = Ph 4o x = 1, M$^1$ = CH$_3$, x = 2, M$^2$ = COOtBu, x = 2, M$^3$ = CONHCH$_2$C≡CH

4a: Yield=70%, $^{1H}$ NMR: (300 MHz, CDCl$_3$) δ 1.15 (t, J=7.46 Hz, 3H), 2.39 (d, J=7.46 Hz, 2H), 2.62 (s, 4H), 3.61-3.71 (m, 4H), 4.23-4.25 (m, 4H)

4b: Yield=61.7%, $^1$H NMR: (300 MHz, CDCl$_3$) δ 2.52-2.58 (m, 4H), 2.66 (t, J=7.75 Hz, 2H), 2.97 (m, J=7.46 Hz, 2H), 3.49-3.60 (m, 4H), 4.10-4.23 (m, 4H), 7.18-7.30 (m, 5H)

4c Yield=37.5%, $^1$H NMR: (300 MHz, CDCl$_3$) δ 1.33-1.68 (m, 15H), 2.36 (dd, 2H, J=7.32 Hz, 7.61 Hz), 2.61-2.63 (m, 4H), 3.05-3.14 (m, 2H), 3.58-3.64 (m, 4H), 4.22 (br, 4H), 4.77 (br, 1H)

4d OTBDMS protected Yield=31.1%, 1H NMR: (300 MHz, CDCl$_3$) δ 0.06 (s, 6H), 0.89 (s, 9H), 2.58-2.63 (m, 6H), 3.60-3.71 (m, 4H), 3.93-3.97 (m, 2H), 4.24 (m, 4H).
OH yield=72%, $^1$H NMR: (300 MHz, CDCl$_3$) δ 2.50-2.61 (m, 6H), 3.50-3.55 (m, 6H), 4.10-4.28 (m, 4H)

4e: Yield=45.1%, $^1$H NMR: (300 MHz, CDCl$_3$) δ 1.63-1.67 (m, 4H), 2.36-2.38 (m, 4H), 2.59 (m, 4H), 3.56-3.60 (m, 4H), 4.19-4.21 (m, 4H), 5.10 (s, 2H), 7.36 (m, 5H)

4f: Yield=69.8%, $^1$H NMR: (300 MHz, CDCl$_3$) δ 1.38-1.48 (m, 2H), 1.59-1.70 (m, 4H), 2.36-2.41 (m, 2H), 2.62 (m, 4H), 3.27-3.32 (m, 2H), 3.61-3.63 (m, 4H), 4.23 (m, 4H)

4 g$_{m:n=0.66:0.33}$: Yield=59.1%, $^1$H NMR: (300 MHz, CDCl$_3$) δ 1.12-1.17 (m, 2H), 2.35-2.40 (m, 2H), 2.53-2.69 (m, 6H), 2.95-3.00 (m, 1H), 3.54-3.61 (m, 5H), 4.14-4.23 (m, 5H), 7.17-7.37 (m, 2H)

4 g$_{m:n=0.5:0.5}$: Yield=59.1%, $^1$H NMR: (300 MHz, CDCl$_3$) δ 1.12-1.17 (m, 3H), 2.35-2.40 (m, 2H), 2.53-2.69 (m, 10H), 2.95-3.00 (m, 2H), 3.54-3.60 (m, 8H), 4.14-4.23 (m, 8H), 7.16-7.30 (m, 6H)

4 g$_{m:n=0.25:0.75}$ Yield=67.8%, $^1$H NMR: (300 MHz, CDCl$_3$) δ 1.11-1.16 (m, 1H), 2.33-2.40 (m, 1H), 2.51-2.68 (m, 11H), 2.94-2.99 (m, 3H), 3.52-3.68 (m, 8H), 4.11-4.22 (m, 8H), 7.10-7.30 (m, 8H)

4h$_{m:n=0.9:0.1}$——: Yield=69.4%, $^1$H NMR: (300 MHz, CDCl$_3$) δ 1.44 (s, 4H), 2.52-2.68 (m, 30H), 2.95-3.00 (m, 9H), 3.51-3.61 (m, 20H), 4.12-4.24 (m, 20H), 7.17-7.29 (m, 23H)

4h$_{m:n=0.75:0.25}$: Yield=66.5%, $^1$H NMR: (500 MHz, CDCl$_3$) 61.44 (s, 9H), 2.52-2.68 (m, 26H), 2.96-2.99 (m, 6H), 3.49-3.65 (m, 16H), 4.14-4.22 (m, 16H), 7.17-7.29 (m, 15H)

4h$_{m:n=0.6:0.4}$: yield=66.7%, $^1$H NMR: (300 MHz, CDCl$_3$) δ 1.44 (s, 9H), 2.52-2.69 (m, 17H), 2.95-3.00 (m, 3H), 3.54-3.65 (m, 10H), 4.14-4.24 (m, 10H), 7.20-7.28 (m, 7H)

4i$_{m:n=0.9:0.1}$——: Yield=69.4%, $^1$H NMR: (300 MHz, CDCl$_3$) δ 1.13 (s, 1H), 2.51-2.67 (m, 6H), 2.93-2.99 (m, 2H), 3.50-3.60 (m, 5.0H), 4.10-4.23 (m, 5.0H), 7.17-7.29 (m, 5H)

4j$_{m:n=0.75:0.25}$: Yield=66.5%, $^1$H NMR: (500 MHz, CDCl$_3$) δ 1.44 (s, 2H), 2.52-2.67 (m, 6H), 2.96-2.99 (m, 1.5H), 3.49-3.65 (m, 4.2H), 4.13-4.22 (m, 4H), 7.17-7.29 (m, 5H)

4i$_{m:n=0.5:0.5}$: Yield=66.7%, $^1$H NMR: (300 MHz, CDCl$_3$) δ 1.44 (s, 6H), 2.52-2.69 (m, 12H), 2.95-3.00 (m, 2H), 3.54-3.65 (m, 7H), 4.41-4.24 (m, 7H), 7.20-7.28 (m, 5H)

With reference to FIG. 1, it can be seen that the glass transition temperature is affected by the types and compositional percentages of the functional pendant group. FIG. 1 compares compositions 4 g and 4i.

4j$_{m:n=0.5:0.5}$: yield=65%, $^1$H NMR: (300 MHz, CDCl$_3$) δ 1.22-1.26 (m, 1H), 1.38-1.68 (m, 15H), 2.37 (m, 2H), 2.56-2.74 (m, 12H), 3.10-3.12 (m, 2H), 3.62-3.67 (m, 8H), 4.02 (m, 2H), 4.24 (m, 8H)

4k$_{m:n=0.5:0.5}$: yield=40%, $^1$H NMR: (300 MHz, CDCl$_3$, TMS) δ 1.33-1.50 (m, 19H), 2.36-2.39 (m, 6H), 2.61 (br, 8H), 3.11 (br, 2H), 3.59 (br, 8h), 4.22 (br, 8h), 5.10 (s, 2h), 7.35 (m, 5H).

4l$_{m:n=0.75:0.25}$: OTBS protected product: yield=72%, $^1$H NMR: (300 MHz, CDCl$_3$) 60.06 (s, 4H), 0.89 (s, 7H), 2.58-2.70 (m, 7H), 2.96-3.01 (m, 1H), 3.54-3.69 (m, 4H), 3.93-3.97 (m, 2H), 4.10-4.24 (m, 4H), 7.22-7.34 (m, 2H). OH$_{m:n=0.75:0.25}$: yield=65%, $^1$H NMR: (300 MHz, DMSO-d$_6$) 2.5-2.88 (m, DMSO, 3H), 3.51-3.64 (m, 13H), 4.10-4017 (m, 5H), 4.59 (br, 1H), 7.17-7.23 (m, 2H).

4l$_{m:n=0.5:0.5}$: yield=80%, $^1$H NMR: (300 MHz, CDCl$_3$) 62.53-2.99 (m, 14H0, 3.53-3.62 (m, 8H), 4.14-4.24 (m, 8H), 4.68 (m, 2H), 7.20-7.27 (m, 5H) OH$_{m:n-0.5:0.5}$: yield=80%, $^1$H NMR: (300 MHz, CDCl$_3$) δ2.53-2.99 (m, 14H0, 3.53-3.62 (m, 8H), 4.14-4.24 (m, 8H), 4.68 (m, 2H), 7.20-7.27 (m, 5H).

4l$_{m:n=0.25:0.75}$: yield=72%, $^1$H NMR: (300 MHz, CDCl$_3$) δ 0.05 (s, 1H), 0.88 (s, 2H), 2.52-2.66 (m, 6H), 2.95-3.00 (m, 2H), 3.53-3.68 (m, 4H), 3.92-3.96 (m, 1H), 4.13-4.22 (m, 4H), 7.14-7.30 (m, 5H). OH$_{m:n=0.25:0.75}$: yield=93%, $^1$H NMR: (300 MHz, CDCl$_3$) δ 2.52-2.70 (m, 6H), 2.94-2.99 (m, 2H), 3.53-3.68 (m, 4H), 4.14-4.22 (m, 4H), 4.68 (br, 1H), 7.20-7.37 (m, 4H).

Figure 2:
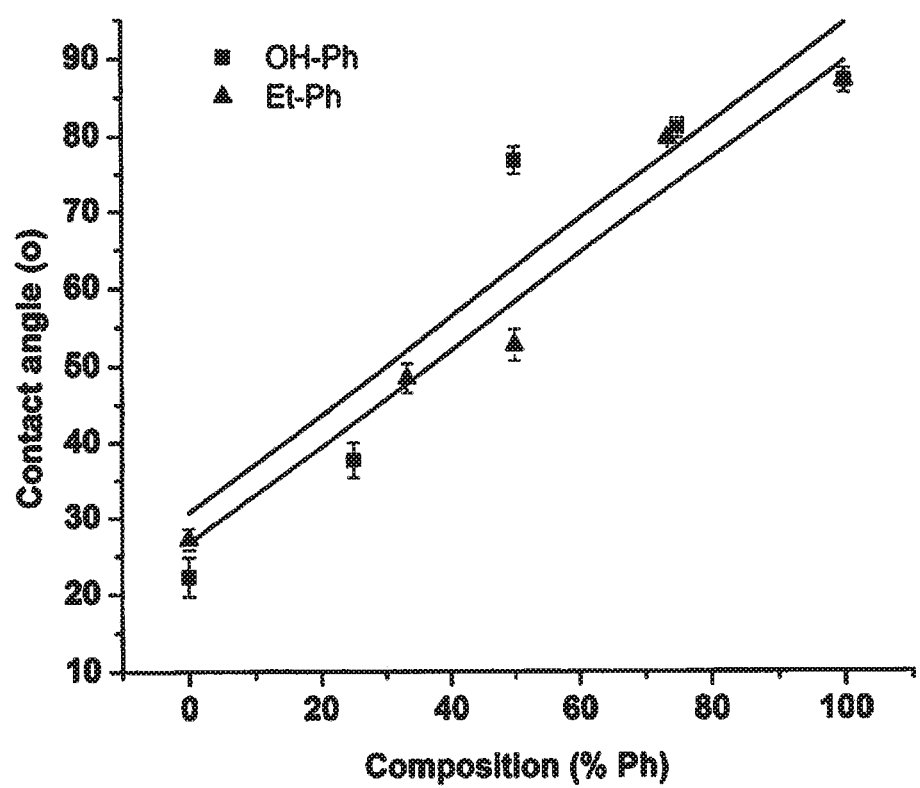
FIG. 2 provides a graphical plot of contact angle versus percent composition of a pendant functional group for one or more embodiments where two different pendent functional groups are present

With reference to FIG. 2, it can be seen that the water contact angle is affected by the types and compositional percentages of the functional pendant group. FIG. 2 compares compositions 4 g and 4l.

4m$_{m:n=0.8:0.2}$ Yield=63.7%, $^1$H NMR: (300 MHz, CDCl$_3$) δ 1.14 (t, J=7.46 Hz, 12H), 1.65 (s, 8H), 2.38 (t, J=7.46 Hz, 8H), 2.57-2.62 (m, 22H), 2.87 (t, J=7.75 Hz, 2H), 3.57-3.62 (m, 20H), 4.17-4.24 (m, 20H), 6.62 (s, 3H)

The 4m polymer includes adhesion properties, and its fabrication is shown below.

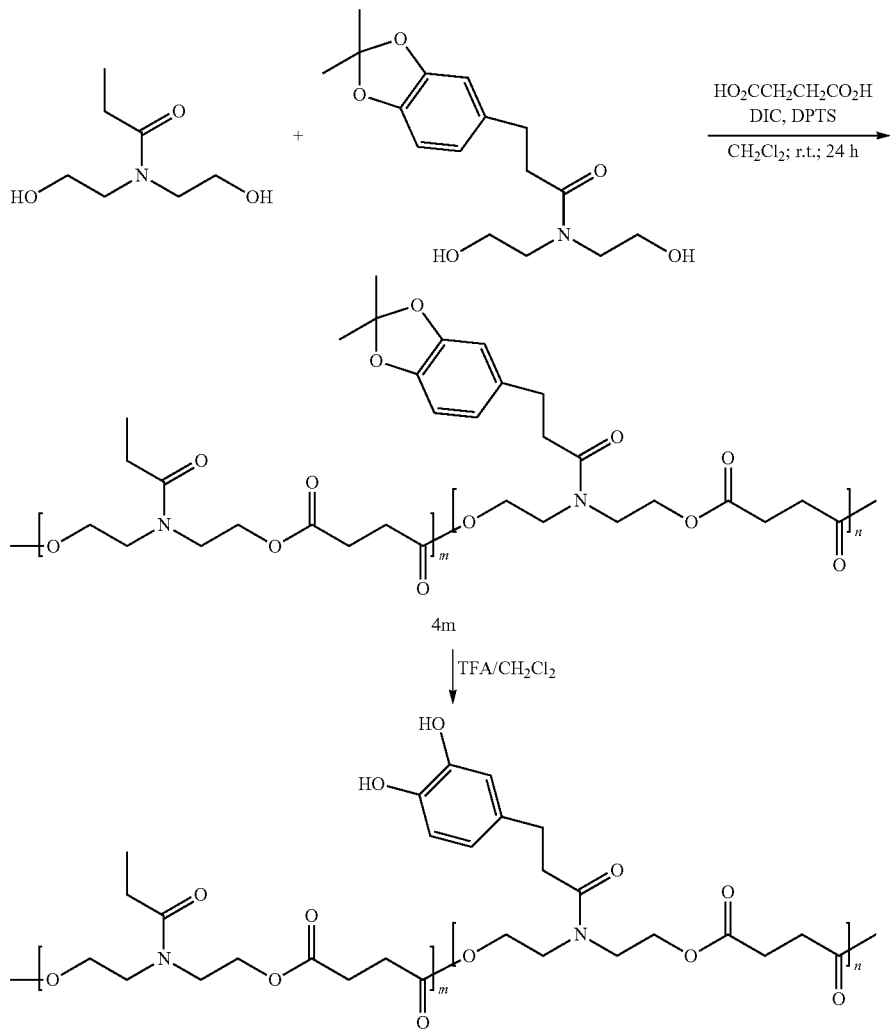

$4n_{m:n=0.9:0.1}$ Yield=78%, $^1$H NMR: (300 MHz, CDCl$_3$) δ 1.90-1.97 (m, 2H), 2.29-2.33 (m, 2H), 2.52-2.38 (m, 60H), 2.82 (s, 2H), 2.97 (t, J=7.61 Hz, 18H), 3.45-3.61 (m, 40H), 4.11-4.24 (m, 40H), 6.24 (s, 2H), 6.50 (s, 2H), 7.16-7.34 (m, 50H)

Polymer 4o: yield=78%. $^1$H NMR: (300 MHz, CDCl$_3$) δ 1.21-1.23 (m, 2.5H), 1.44 (s, 9H), 2.36-2.73 (m, 18H), 3.61-3.75 (m, 10H), 4.01-4.03 (m, 10H)

Conjugation of dyes to 4j

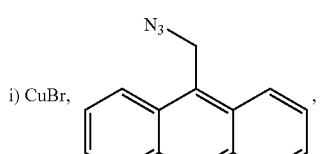
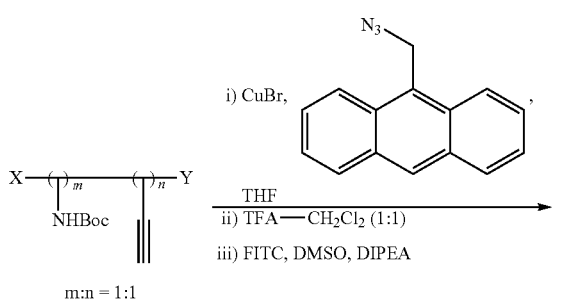

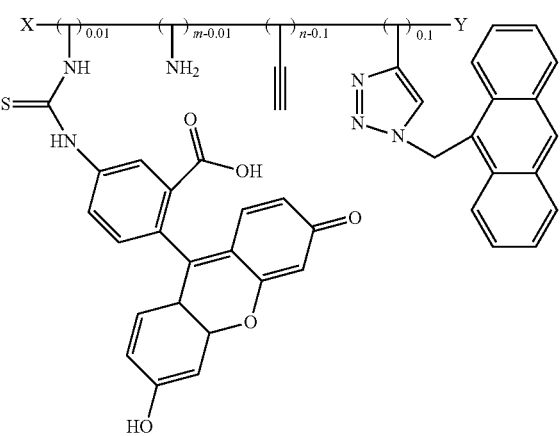

Conjugation of azido anthracene to 4j: Polymer 4j (0.1 g) was taken in 2 mL of THF. To this solution CuBr (cat.) and 9-Methylenazidoanthracene (12% of propargyl group on polymer) were added and reaction was stirred for 4 hrs. Then polymer was precipitated in diethyl ether. Then polymer was redissolved in 1 mL THF and this solution was dropped into 20 mL EDTA (20 mmol) solution to remove the cooper salts.

Conjugation of FITC to polymer 4j: Above polymer (0.1 g) was taken in 2 mL of DCM, TIPS 50 μL was added to it. This solution was cooled to 0° C. and 2 mL of TFA was added to it and stirred for 2 hrs. at RT. Then TFA-DCM mixture was removed under reduced pressure and polymer was precipitated from diethyl ether. Polymer was dried and used for reaction with FITC. Above polymer was taken in 1 mL DMSO and FITC dissolved in DMSO (1% of amine groups in polymer) was added and reaction was stirred for 2 hrs. Then polymer was precipitated from diethyl ether.

Synthesis of polymer and its functionalization and their cell adhesion studies.

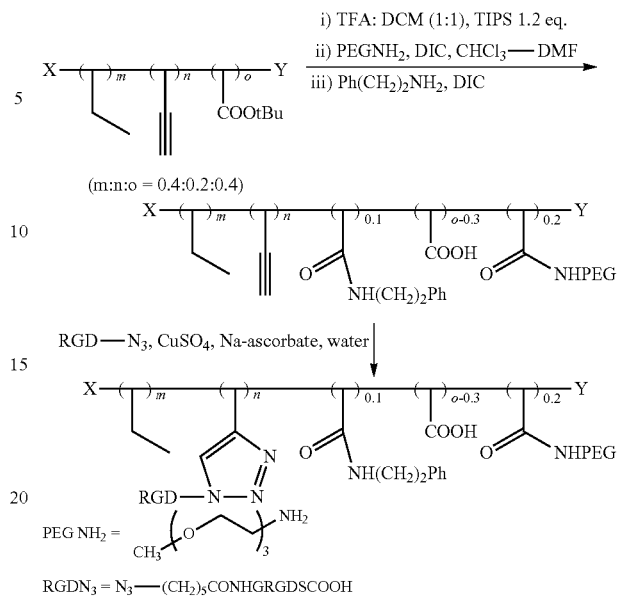

Polymer 4o: yield=78%. $^1$H NMR: (300 MHz, CDCl$_3$) δ 1.21-1.23 (m, 2.5H), 1.44 (s, 9H), 2.36-2.73 (m, 18H), 3.61-3.75 (m, 10H), 4.01-4.03 (m, 10H)

Polymer 4o-COOH: Polymer 4o (1 g) was taken in 5 mL DCM and TIPS (0.5 mL) was added it. After cooling this reaction mixture to 0° C., TFA (5 mL) was added and reaction stirred at room temp for 2 Hrs. Then TFA was distilled under reduced pressure and polymer was precipitated in diethyl ether and dried. Yield=90%. $^1$H NMR: (300 MHz, DMSO-d$_6$) δ 1.05-1.16 (m, 2.5H), 2.32-2.56 (m, 18H, DMSO), 3.50-3.60 (m, 10H), 3.83 (m, 1H), 4.10-4.18 (m, 10H), 8.23 (m, 0.5H)

Functionlization of polymer 4o-COOH with short PEG analogs and RGD peptide

Coupling of 2-[2-(2-Methoxyethoxy)ethoxy)ethyl amine (PEGNH2) to carboxyl grou000p of Polymer Polymer 4o-COOH (0.1 g) was taken in 1 mL mixture of CHCl$_3$-DMF (10:1) and DIC (12 μL, 55% of COOH group) was added to it. After 15 mins PEGNH2 (11.34 mg, 50% vof COOH groups) was added to it. Reaction was stirred for 2 hrs and then DIC (6 μL, 22% of COOH group) was added again for further activation. To this activated reaction mixture 2-phenyl ethylamine (4.3 μL, 20% of COOH groups) was added and reaction further stirred for 2 hrs. This functionalized polymer was precipitated from cold 2-propanol and centrifuged and dried.

4o-COOH+2-phenyl ethylamine (P): Similar procedure was followed as above for the functionalization of polymer 4o-COOH with 2-phenyl ethyl amine.

Spincoating of polymers on glass cover slips: Cover slips were cleaned by soaking them into ethanol-NaOH solution for 30 mins. Then washed with distilled water and dried under strong stream of air making sure the cover slips were spot and debris free.

The polymers were spin coated from 2% (w/v) polymer solution in CHCl$_3$: DMF (10:1) mixture. Spin coating of polymers were carried out at 2500 rpm for 1 min. Theses slides were then dried and used for further functionalization and contact angle measurements.

Surface Fuctionlization: The surface propargyl groups were reacted with azide terminated RGD peptide by Huisgen 1,3-cycloaddition reaction. The reagent was prepared by mixing 0.5 mL of CuSO$_4$ (5 mM), 0.5 mL of sodium ascorbate (10 mM), and 0.25 mL of N$_3$-HA-GRGDS (2 mM). The propargyl functionalized coverslips were inverted over a solution (50 μL) of the Click reagent and allowed to react for 4 h. Then these coverslips were washed with deionized water and were inverted over 50 μL solution of 20 mM EDTA solution and left for 4 hrs. These coverslips were washed again with deionized water and dried under vacuum.
Polyurethanes Polymers
Synthesis of Polyurethanes from Functionalized Diols and Hexamethylene Diisocyanate

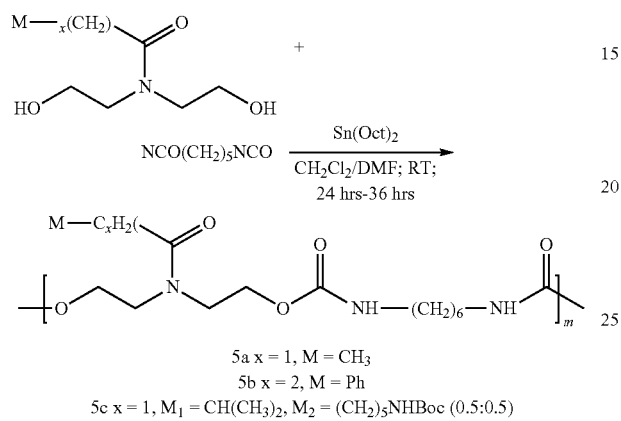

5a x = 1, M = CH$_3$
5b x = 2, M = Ph
5c x = 1, M$_1$ = CH(CH$_3$)$_2$, M$_2$ = (CH$_2$)$_5$NHBoc (0.5:0.5)

Experimental procedure: 5a and 5b: One equivalent of diol and one equivalent of diisocyanate were added to a clean round bottom flask under inert atmosphere. The diol and diisocyanate were then dissolved in dry CH$_2$Cl$_2$. The solution was stirred via magnetic stir bar for 10 minutes before addition of a catalytic amount of tin octoate. The reaction continued stirring at room temperature for 24-36 hours. The resulting polymers were dissolved in chloroform and precipitated in cold diethyl ether.

5c: A feed ratio of 1:1:2 of Diol 1:Diol 2:Diisocyanate were added to a clean round bottom flask under inert atmosphere. The diols and diisocyanates were then dissolved in dry DMF or dry CH$_2$Cl$_2$. The solution was stirred via magnetic stir bar for 10 minutes before addition of a catalytic amount of tin octoate. The reaction continued stirring at room temperature for 24-36 hours. The resulting polymers were dissolved in chloroform and precipitated in cold diethyl ether.

5a: Yield=78%, $^1$H NMR: (300 MHz, CDCl$_3$) 1.24-1.36 (m, 4H), 1.60-1.66 (m, 1H), 2.58-2.65 (m, 1H0, 2.66 (br, 1H), 2.84-3.02 (m, 3H), 3.09 (dd, J=11.6 Hz, 6.44 Hz, 2H), 3.44-3.59 (m, 2H), 4.06-4.22 (m, 2h), 7.14-7.31 (m, 6H).

5b: Yield=78%, $^1$H NMR: (300 MHz, CDCl$_3$) 1.05-1.15 (m, 3H), 1.26-1.36 (m, 5H), 1.41-1.51 (m, 5H), 1.63-1.71 (m, 1H), 2.31-2.40 (m, 2H), 3.05-3.15 (m, 4H), 3.52-3.61 (m, 4H), 4.13-4.23 (m, 4H).

5c: Yield=78%, $^1$H NMR: (300 MHz, DMSo-d$_6$) 0.82-0.91 (m, 3H), 1.19-1.26 (m, 3H), 1.30-1.38 (m, 4H), 1.48-1.60 (m, 2H), 2.91-2.99 (m, 3H), 3.40-3.56 (m, 9H), 3.97 (br, 1H), 4.01-4.09 (m, 2H), 8.30-8.33 (m, 1H).

What is claimed is:

1. A functionalized amide polymer comprising:
a polyester backbone;
an amide group with a pendant functional group, where the nitrogen atom of the amide group is part of the polymer backbone, where the functionalized amide polymer is formed by a process that comprises a reaction of a dicarboxylic acid and a diol that includes an amide group, or a reaction of a diol and a dicarboxylic acid that includes an amide group, and where the pendant functional group is selected from the group consisting of azides, carboxylic acids, hydroxyls, amines, nitriles, furans, aldehydes, ketones, maleimides, propargyls, halogens, imaging labels, peptides, amino acids,

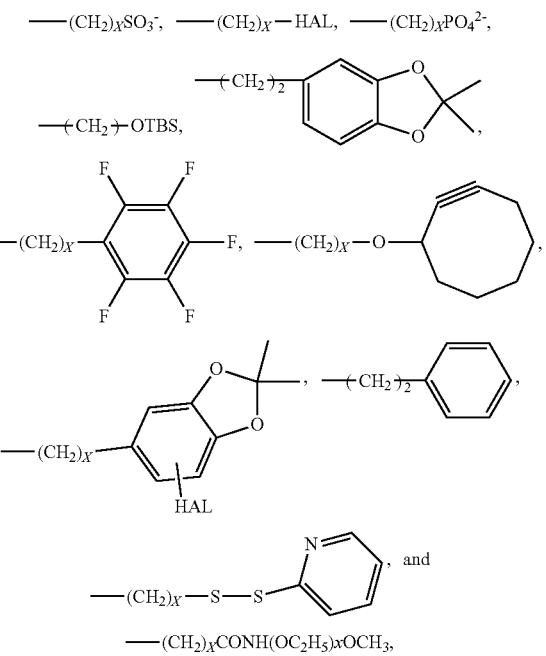

wherein HAL is halogen, wherein x is from 0 to 6, and wherein TBS is tertbutyl dimethylsilyl.

2. The functionalized amide polymer of claim 1, where the functionalized amide polymer includes a unit defined by formula (XV) or formula (XVI):

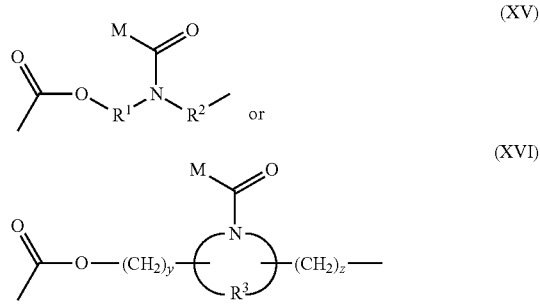

where R$^1$ and R$^2$ may be the same or different and are each hydrocarbon groups; R$^3$ is a heterocyclic group that includes the nitrogen atom as a hetero atom within the heterocyclic group; y and z may be the same or different and are from 0 to 4, and M is a pendant functional group.

3. The functionalized amide polymer of claim 1, where the functionalized amide polymer includes a unit defined by formula (XVII) or formula (XVIII):

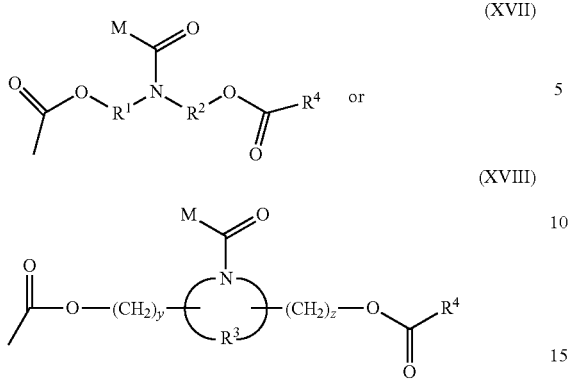

where R¹ and R² may be the same or different and are each hydrocarbon groups; R³ is a heterocyclic group that includes the nitrogen atom as a hetero atom within the heterocyclic group; y and z may be the same or different and are from 0 to 4, R⁴ is a hydrocarbon group, and M is a pendant functional group.

4. The functionalized amide polymer of claim 1, where the pendant functional group is a group suitable for post polymerization functionalization and includes a group selected from azides, carboxylic acids, hydroxyls, amines, nitriles, furans, aldehydes, ketones, maleimides, propargyls, and halogens.

5. The functionalized amide polymer of claim 1, where the pendant functional group is selected from the group consisting of imaging labels, peptides, and amino acids.

6. The functionalized amide polymer of claim 1, where the pendant functional group is an amino acid side chain selected from histidine, alanine, isoleucine, arginine, leucine, asparagine, lysine, aspartic acid, methionine, cysteine, phenylalanine, glutamic acid, threonine, glutamine, tryptophan, glycine, valine, proline, serine, and tyrosine.

7. The functionalized amide polymer of claim 1, where the pendant functional group is selected from

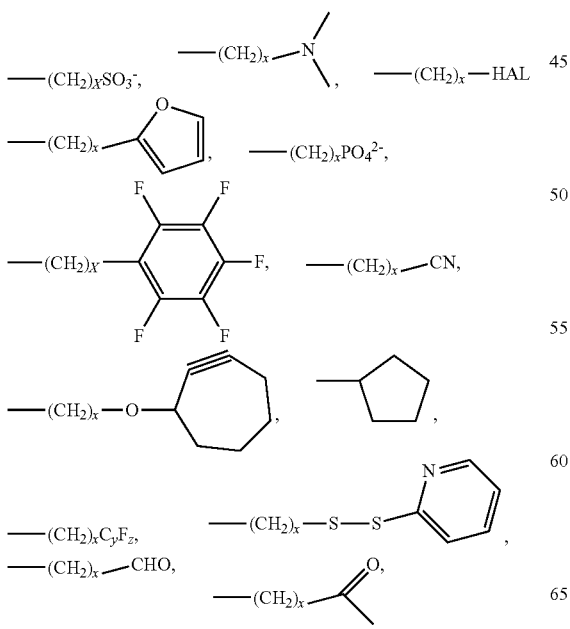

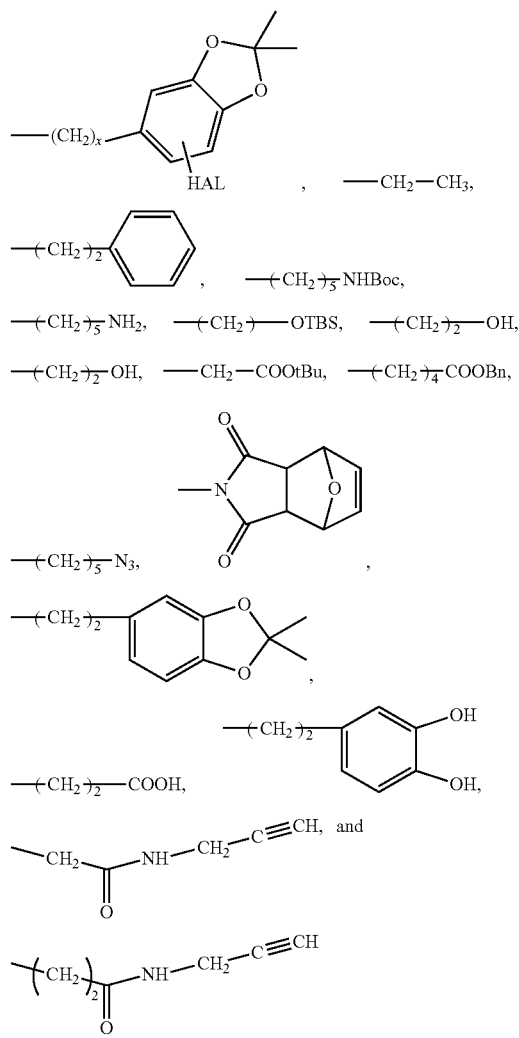

wherein x is from 0 to 6, and HAL denotes a halogen.

8. The functionalized amide polymer of claim 1, where the pendant functional group is selected from

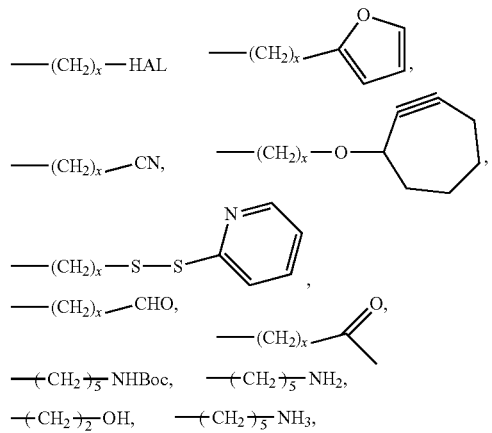

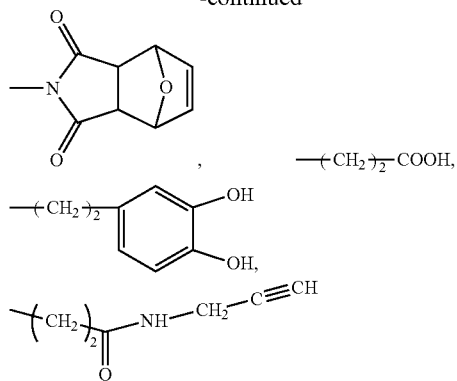

, —(CH₂)₂—COOH,

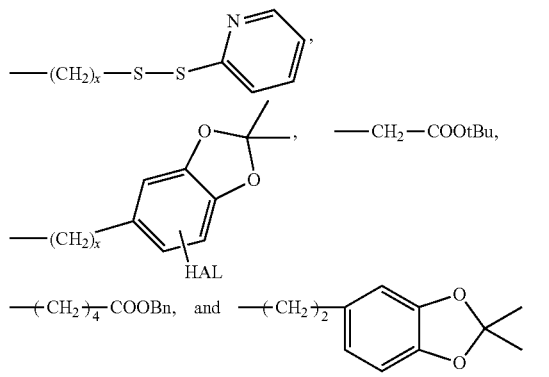

wherein x is from 0 to 6, and HAL denotes a halogen.

9. The functionalized amide polymer of claim 1, where the pendant functional group is selected from

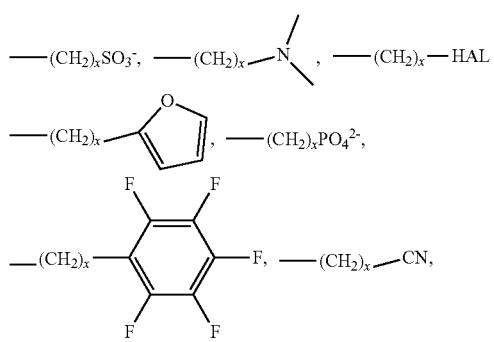

wherein x is from 0 to 6, and HAL denotes a halogen.

10. A functionalized amide polymer comprising:
a polyester backbone;
an amide group with a pendant functional group, where the nitrogen atom of the amide group is part of the polymer backbone, where the functionalized amide polymer is formed by a process that comprises a polycondensation reaction of a carboxylic acid and a diol that includes an amide group, where the pendant functional group is selected from the group consisting of organic pendant functional groups, amino acid side chains, and protected groups, and where the organic pendant functional group is selected from

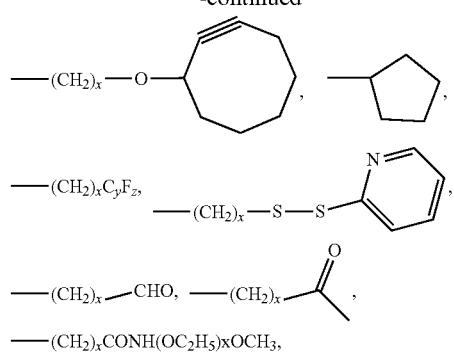

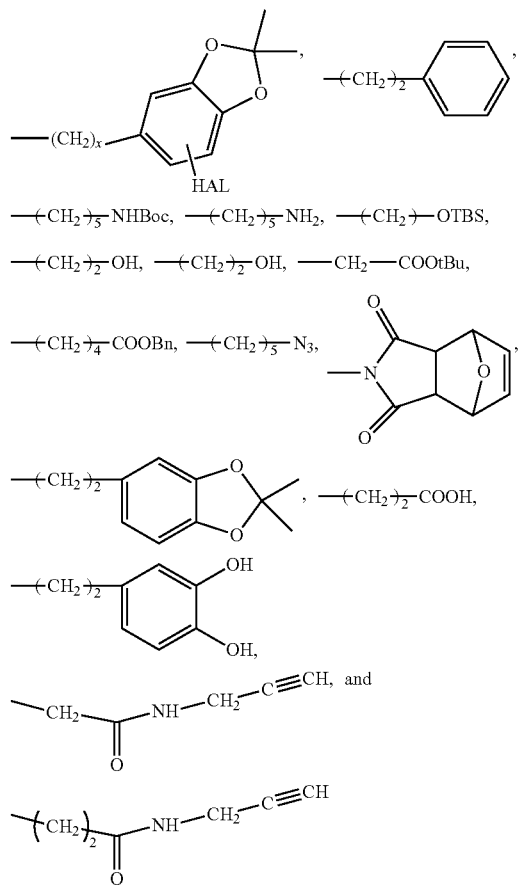

wherein x is from 0 to 6, and HAL denotes a halogen.

11. The functionalized amide polymer of claim 10, where the protected groups are selected from

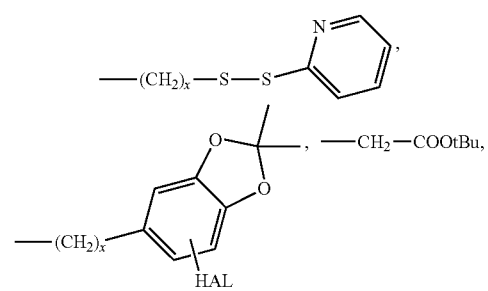

-continued

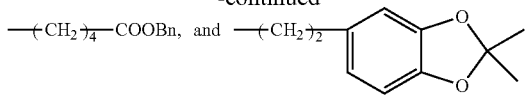

wherein x is from 0 to 6, and HAL denotes a halogen.

12. A functionalized amide polymer comprising:
a polyester backbone;
an amide group with a pendant functional group, where the nitrogen atom of the amide group is part of the polymer backbone, where the functionalized amide polymer is formed by a process that comprises a reaction of a dicarboxylic acid and a diol that includes an amide group, or a reaction of a diol and a dicarboxylic acid that includes an amide group, where the pendant functional group is a group suitable for post polymerization functionalization and includes a group selected from azides, carboxylic acids, hydroxyls, amines, nitriles, furans, aldehydes, ketones, maleimides, propargyls, or halogens.

13. The functionalized amide polymer of claim 12, where the group suitable for post polymerization functionalization is selected from

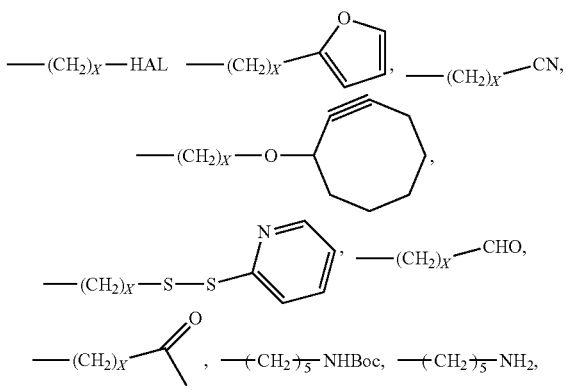

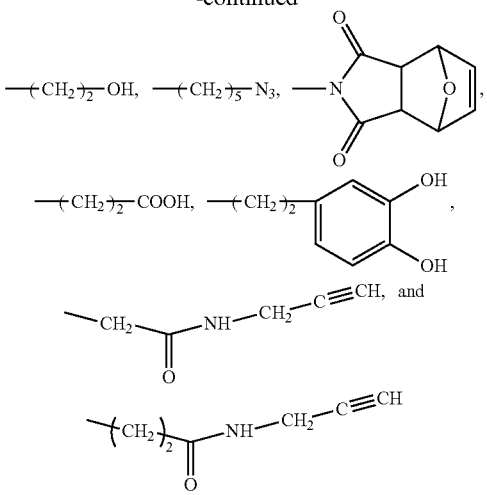

wherein x is from 0 to 6, and HAL denotes a halogen.

14. A functionalized amide polymer comprising:
a polyester backbone;
an amide group with a pendant functional group, where the nitrogen atom of the amide group is part of the polymer backbone, where the pendant functional group is selected from the group consisting of imaging labels, peptides, and amino acids.

15. A functionalized amide polymer comprising:
a polyester backbone;
an amide group with a pendant functional group, where the nitrogen atom of the amide group is part of the polymer backbone, where the pendant functional group is an amino acid side chain selected from histidine, alanine, isoleucine, arginine, leucine, asparagine, lysine, aspartic acid, methionine, cysteine, phenylalanine, glutamic acid, threonine, glutamine, tryptophan, glycine, valine, proline, serine, and tyrosine.

* * * * *